No. 888,147. PATENTED MAY 19, 1908.
W. C. DOIDGE.
GARDEN IMPLEMENT.
APPLICATION FILED JUNE 24, 1907.
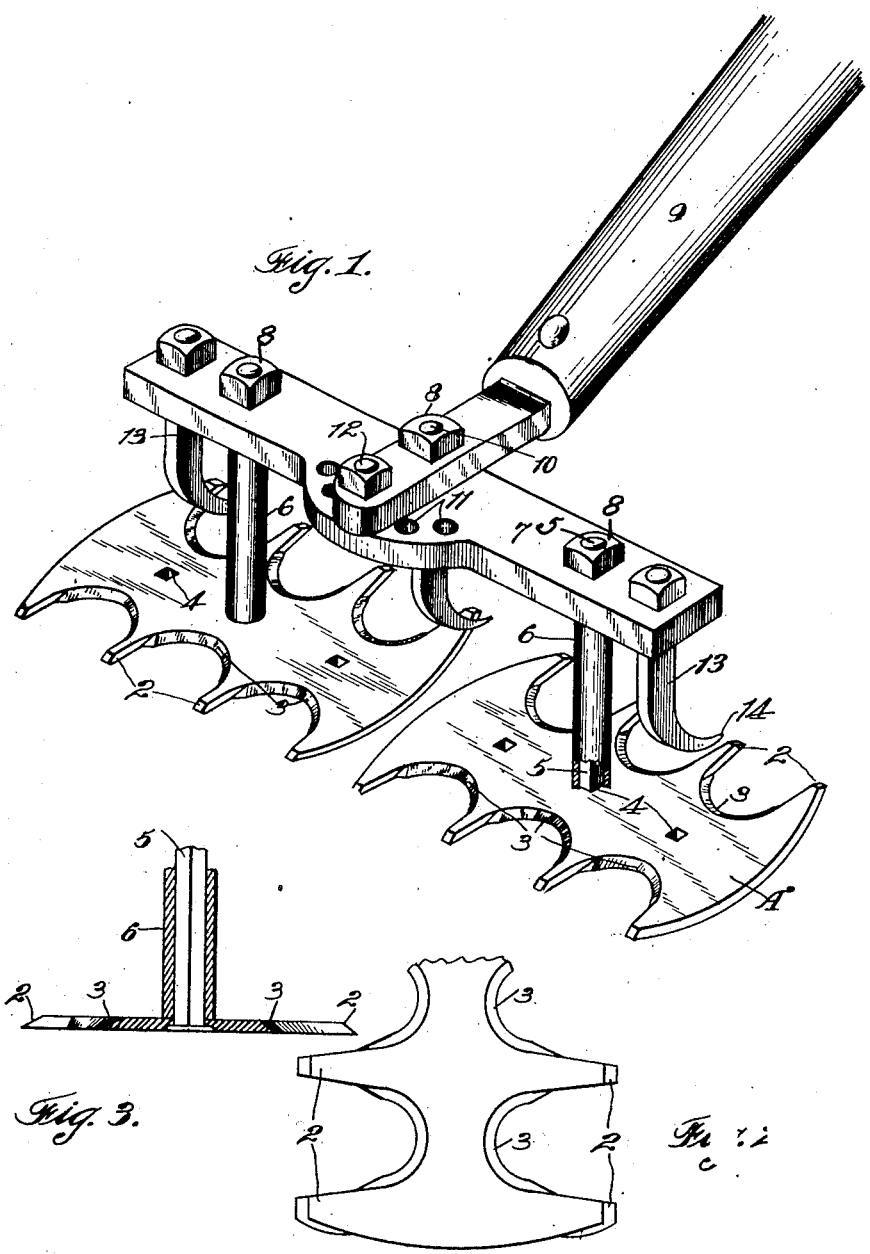
WITNESSES
INVENTOR:
William C. Doidge,
BY Geo. H. Strong.
ATTORNEY

UNITED STATES PATENT OFFICE.

WILLIAM C. DOIDGE, OF LODI, CALIFORNIA.

GARDEN IMPLEMENT.

No. 888,147.      Specification of Letters Patent.      Patented May 19, 1908.

Application filed June 24, 1907. Serial No. 380,515.

*To all whom it may concern:*

Be it known that I, WILLIAM C. DOIDGE, a citizen of the United States, residing at Lodi, in the county of San Joaquin and State of California, have invented new and useful Improvements in Garden Implements, of which the following is a specification.

My invention relates to an implement which is especially designed for loosening the soil, cutting weeds and smoothing the surface in gardens and like places.

It consists in a combination of devices for loosening the soil and clearing it of weeds, and in details of construction which will be more fully explained by reference to the accompanying drawings, in which—

Figure 1 is a perspective view of the implement. Fig. 2 is a plan view of a portion of the blade. Fig. 3 is a sectional detail.

It is the object of my invention to provide a device for loosening up the soil, clearing it of weeds, especially between rows of plants in which the width of space between the rows may vary, and to provide for a variety of adjustments of the cutting and propelling parts, whereby a more effectual tilling of the soil is effected.

My present cutter consists of a plate A, this plate being any suitable or desired length, and having 'its edges serrated or formed into teeth 2 upon one or both sides. These teeth are formed with approximately straight parallel sides at the outer ends, and at the inner ends each pair merge into segmental curves by which they are united, as at 3. The edges of the teeth are here shown as approximately straight, and the ends of the teeth and the curves are beveled or sharpened at the bottom, so as to form cutters. The teeth thus formed enter the soil and hold the blade in line, causing the implement to run steady.

At any suitable or desired points within the plate A are made openings 4.

5 is a stem or shank adapted to fit either of the holes 4, and its lower end may have an enlarged head fitting a countersink in the lower part of the plate, so that when the stem has been inserted from below the head will lie flush with the bottom of the plate A.

6 is a sleeve through which the stem loosely passes. The lower end of this sleeve rests upon the top of the plate A, and the upper end is in contact with the underside of a head 7, through which holes are made, and the upper end of the stem 5 passes through one of the holes and is secured by a nut, as shown at 8. The stem 5 is loosely turnable within the sleeve 6, and by loosening the nut and changing the position of the stem in the head, the cutter A may be adjusted to any angle with relation to the head 7.

9 is a handle conveniently arranged, and this handle is pivoted to the head 7 by means of a bolt and nut, as at 10. The end of the handle extends beyond the pivot, and has a hole made through it which may register with a series of holes 11, arranged in semicircular form upon the side of the head opposite to the longer arm of the handle. By means of a bolt 12 passing through the hole in the handle and entering either of the holes 11, it will be seen that the handle may be turned to stand at any desired angle with relation to the head 7, and at the same time the cutter blade A may also be turned at an angle with the head, and independent of the position of the handle 9. The outer ends of the blade A may have a convex shape, and these outer edges play an important part in working between or contiguous to rows of plants where it is desirable to cultivate close to them without injury.

In the operation of the device the handle 9 may be set either at right angles with the head 7, or diagonally thereto, and the cutter plate A may be similarly adjustable with relation to the head and handle, so tl t a great variety of lines of travel for the cutter may be effected with relation to the position of the handle. By setting the cutter in a diagonal position to the line of travel, the outer end of the blade, which is contiguous to the plants to be cultivated, presents a diagonally moving convexity, the front point being at some distance inside the line of the plant, while the rear point will be carried as closely to the plant as may be desired without absolutely touching it. The effect is to produce a pulverizing effect upon the soil through which the blade is being moved. At the same time, the action of the blade will be to force a portion of the earth toward the plant, and thus hill up the earth around and against the plant. The points of the teeth 2 entering the soil will first loosen and break up any clods or hard portions, and the earth sliding along the edges of the teeth into the convexities will be more completely pulverized; at the same time, the weeds will be cut by the shearing action of the movement. If any sticks, stones or other hard impediments are encountered by the teeth, the movement of the implement is so made, that they will slide off the points and into the convexities between the teeth, thus deflecting them or cutting them so that the implement will continue its motion. The movement of the implement may either be made by pushing or by pulling upon the handle the angle of the cutter plate, and the teeth being made to conform to the desired action of the apparatus.

If the foliage of the plant is close to the ground, and it is desirable to reach under it toward the body, the stem or shank 5, with its sleeve 6 may be transferred to any one of the points 4 near the outer end of the cutter, so that the other end will project to a suitable distance to one side of the head 7, and the handle. It will also be manifest that under certain conditions, while the cutting may be made upon each side and in the line of movement of the handle, the cutter blade may be centrally fixed with relation to the handle. It is also possible to use a plurality of cutting blades, each one having an independent stem 5 to secure it to the head 7, and each being independently adjustable out or in, or to have its angle changed with relation to the line of travel.

13 are substantially vertical shanks which may be secured to the head 7, extending downwardly toward the cutter plate A, and having the lower end gradually curved and terminating in narrow and approximately sharp points 14. These points are so located with relation to the cutter plates A that they serve to gather and remove any weeds which have been severed by the cutter. These points may, if desired, be also allowed to enter the soil and to assist in pulverizing and loosening the same.

Having thus described my invention, what I claim and desire to secure by Letters Patent is—

1. In a cultivating implement, a unitary cutter plate having a plurality of teeth projecting from opposite sides, said teeth extending forward of and having their bases connected to and merging into intermediate concavities with sharpened edges, an upwardly projecting stem or shank, said plate having a plurality of holes for connecting said stem or shank with the plate at different points, a head with which the stem is adjustably connected, and a handle with means for adjustably connecting it with the head.

2. In a cultivating implement, a single plate having a plurality of teeth upon opposite sides, with intermediate concavities into which the teeth merge, said concavities having beveled sharpened edges, convexed ends to the plates, merging into the points of the outermost teeth and having the outer periphery not beveled, a stem or shank, with means for adjustably connecting it with the cutter, a head with which the stem or shank may be adjustably connected, and a handle with means for adjustably connecting it with the head.

3. A cultivating implement, including an elongated plate having concavities with beveled sharpened edges, said concavities merging into teeth which extend outwardly therefrom upon opposite sides, a stem or shank having loosely inclosing sleeve, a head, and means for adjustably securing the stem thereto, vertically disposed teeth extending downwardly from said head, having the lower ends curved and tapered to points contiguous to the cutter plate, and a handle adjustably secured to the head.

4. A cultivating implement, including a head, a handle adjustably secured thereto, a plurality of unitary cutting plates each having stems and means by which said stems are removably secured to the head, said cutter plates having substantially parallel long sides and convex ends, and each of said long sides having a plurality of concaved beveled cutting edges with contiguous concavities merging into outwardly extending teeth with substantially parallel edges, and means by which said plates may be independently adjusted with relation to the head.

In testimony whereof I have hereunto set my hand in presence of two subscribing witnesses.

WILLIAM C. DOIDGE.

Witnesses:
C. M. FERDUN,
A. O. EDDLEMAN.